United States Patent [19]

Sato

[11] Patent Number: 5,274,536

[45] Date of Patent: Dec. 28, 1993

[54] ILLUMINATION COVER FOR FLUORESCENT LAMP

[75] Inventor: Motoaki Sato, Chofu, Japan

[73] Assignee: Kabushiki Kaisha Mochiro Kikaku, Tokyo, Japan

[21] Appl. No.: 894,729

[22] Filed: May 27, 1992

[30] Foreign Application Priority Data

Jul. 2, 1991 [JP] Japan .................. 3-58895[U]

[51] Int. Cl.⁵ .............................................. F21V 5/02
[52] U.S. Cl. ................................. 362/338; 362/260; 362/331; 362/339
[58] Field of Search ............... 362/217, 219, 223, 260, 362/330, 331, 332, 337, 338, 339

[56] References Cited

U.S. PATENT DOCUMENTS

| | | | |
|---|---|---|---|
| 2,269,554 | 1/1942 | Rolph | 362/331 |
| 2,474,317 | 6/1949 | McPhail | 362/339 |
| 2,640,149 | 5/1953 | Arenberg | 362/330 |
| 3,211,904 | 10/1965 | Schwenkler | 362/260 |
| 3,251,987 | 5/1966 | Wince | 362/339 |
| 3,330,952 | 7/1967 | Wince et al. | 362/339 |
| 3,716,710 | 2/1973 | Clostermann et al. | 362/339 |
| 3,764,800 | 10/1973 | Clostermann | 362/330 |
| 3,829,680 | 8/1974 | Jones | 362/330 |
| 4,053,762 | 10/1977 | Barbson | 362/339 |
| 4,161,019 | 7/1979 | Mulvey | 362/260 |
| 4,891,737 | 1/1990 | Szymanek | 362/331 |

Primary Examiner—Albert J. Makay
Assistant Examiner—Y. Quach
Attorney, Agent, or Firm—Emmanuel J. Lobato; Robert E. Burns

[57] ABSTRACT

A fluorescent lamp cover molded as a unitary hollow structure made of light-transparent synthetic acrylic resin having an opening for receiving the fluorescent lamp in the interior of the cover. A prismatic diffuser plate of the lamp cover has an interior flat major side surface and on an opposite side surface of the plate an exterior major side surface having a pattern of adjacent pyramidal projections having flat sides through which the illumination light energy from the fluorescent lamp incident on the interior flat major side surface passes outwardly of the cover. The pyramidal projections are of two types and each have an apex which defines the outermost exterior point of the corresponding pyramidal projection. The prismatic diffuser plate interior flat major side surface is spaced a selected distance from the fluorescent lamp within in the interior of the cover so that the exterior major side surface pattern of pyramidal projections diffuses the light energy passing therethrough and effectively renders the configuration of the fluorescent lamp indistinguishable when the lamp is on and the cover prismatic diffuser plate is viewed from the exterior. This relationship causes the cover prismatic plate to appear to be an independent source of illumination. Other sides of the cover have internal or external situations for effecting light diffusion and are formed as parallel grooves with parallel ridges or ribs between the grooves.

2 Claims, 3 Drawing Sheets

ILLUMINATION COVER FOR FLUORESCENT LAMP

BACKGROUND OF THE INVENTION

Field of the Invention

This invention relates generally to lamp covers and more particularly an illumination cover for a fluorescent lamp for use inside rooms and compartments of railway cars and the like.

Exposed light sources are generally optimal to use to obtain the maximum light energy from the light source. Generally illumination devices are provided with a cover for avoiding the danger of rupture of the lamp therein and the covers are frequently made so that they improve the appearance of the illumination device.

The light transmission factor of opal glass or frosted glass light sources has been in the past in the order of 55%. When such lamps are used additional fluorescent lamps and electric power necessary for the additional lamps is required because of the reduced illumination factor of such devices. This results in substantially uneconomical light sources.

Furthermore the need of increase in fluorescent lamps and fixtures results in an increase in weight in vehicles such as railway cars and increases cost in the manufacture thereof.

SUMMARY OF THE INVENTION

The invention provides a highly efficient and economical illumination cover for fluorescent lamps.

An object of the invention is to provide a fluorescent lamp cover which has a low loss of light and can be readily produced by integral molding thereof with a simple mold of male and female molds without need of a split-cavity mold.

Still another object of the present invention is to provide a transparent prismatic diffuser plate structure exhibiting the phenomenon of light diffusion such that the fluorescent lamp light source can be rendered indistinguishable from externally of the lamp by positioning the prismatic diffuser spaced a relatively short distance from the lamp to render the light source indistinguishable from the exterior and cause the prismatic diffuser to function as an illumination surface.

BRIEF DESCRIPTION OF THE DRAWINGS

The fluorescent lamp cover according to the invention is described herein and the appended claims and is illustrated in the following drawings in which:

DESCRIPTION OF THE PREFERRED EMBODIMENTS

Figure 1:
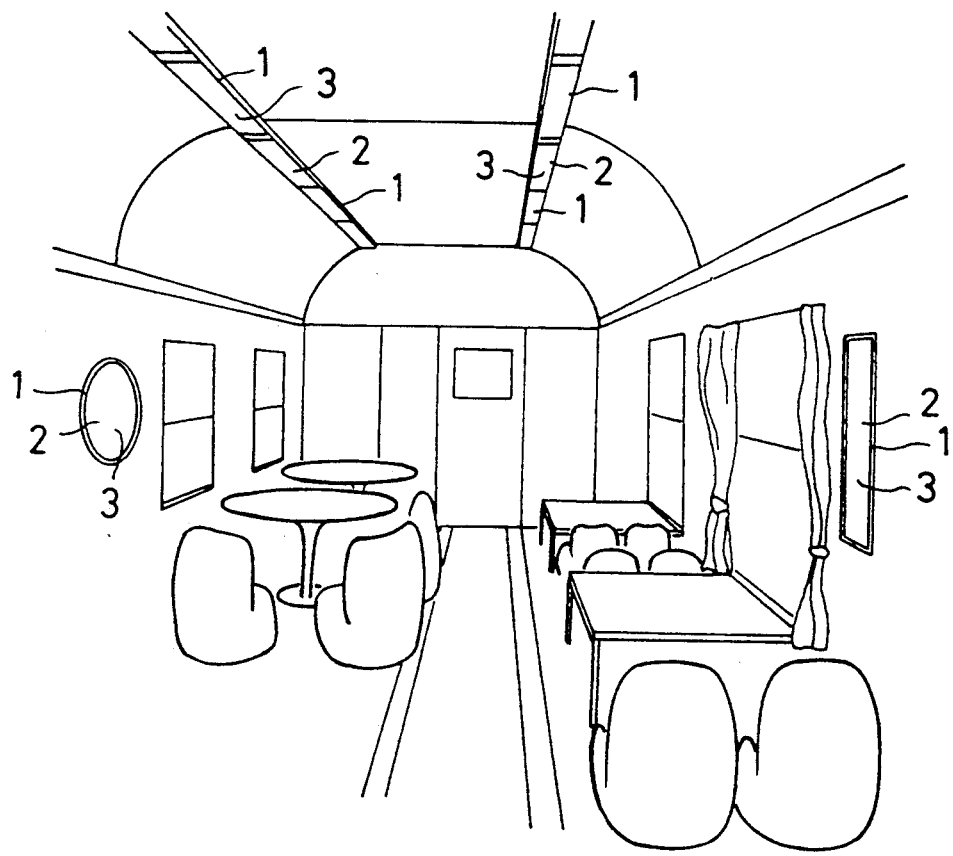
FIG. 1 is a diagrammatic perspective view of a railway car illustrating the use of the fluorescent lamp cover device according to the invention.

As illustrated in FIG. 1 a fluorescent lamp cover 1 can be constructed in various configurations and can be mounted overhead or on wall surfaces. FIG. 1 shows diagrammatically a railway car in which fluorescent lamp covers 1 are mounted end-on-end overhead on the ceiling of the railway car illustrated. These covers are of a rectangular configuration. The lamp cover 1 can also be constructed in an oval configuration and a rectangular configuration for wall mounting as shown diagrammatically on the side walls of the railway car.

Figure 2:
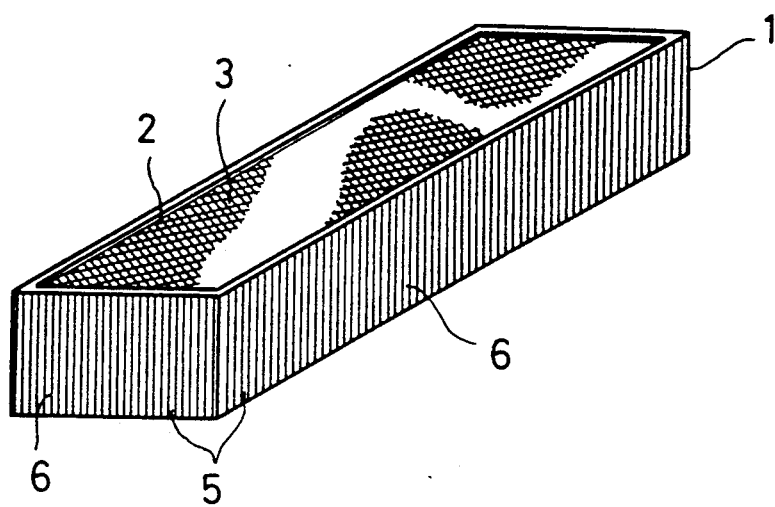
FIG. 2 is a perspective view of one embodiment of a fluorescent lamp cover according to the invention.

The overhead light sources are provided with rectangular fluorescent lamp covers 1 as illustrated in FIG. 2 and the wall fluorescent lamps are recessed into the wall and prismatic diffuser plates of the covers 1 provide the illumination surfaces on the walls for the interior of the compartment of the railway car.

The fluorescent lamp cover 1 illustrated in FIG. 2 is an integral unitary molded structure having a prismatic diffuser plate 2 having an exterior major surface 3 on which are formed pyramidal projections which function to diffuse the light energy incident on a flat inner major surface 4 when the cover 1 is mounted over a fluorescent light. The fluorescent light cover 1 has opposite ends and sides 5 which are formed as plates integral with the prismatic diffuser plate 2 defining a rectangular cover.

The side plates 5 have internal striations 6 formed as grooves which are parallel with a ridge therebetween. The side plates 5 have a height dimension H and are normal to the prismatic diffuser plate 2 in order to minimize the visibility of the internal light source within the cover and to render the striations or grooves 6 more effective in diffusing the light energy.

Figure 3:
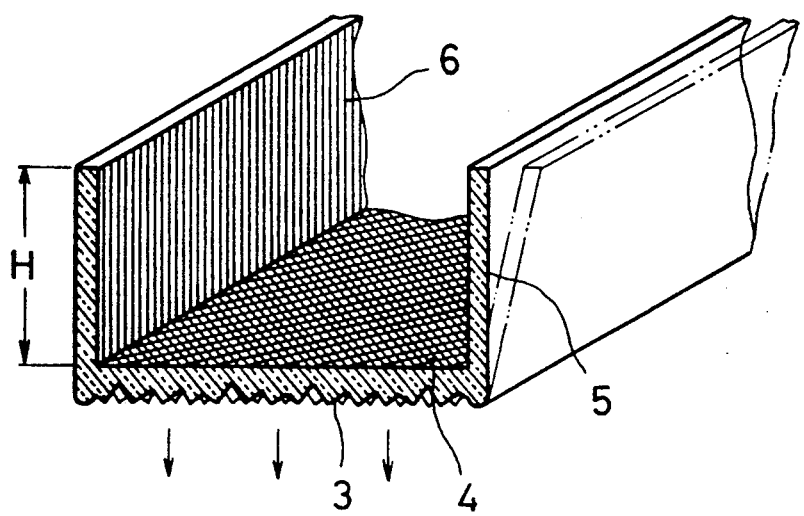
FIG. 3 is a fragmentary sectional view of the fluorescent lamp cover illustrated in FIG. 2.

If the side plates 5 are not normal to the plane of the internal major flat surface 4 and are inclined relatively thereto, as illustrated in broken lines in FIG. 3, the striations 6 are less effective in diffusion of the light energy from the internal light source and accordingly the lights source interiorly of the cover is more readily distinguishable.

The fluorescent light cover 1 illustrated in FIGS. 1 and 2 have the plates 5 with the height dimension H such that a fluorescent light 7 made as a tube is spaced a distance L from the flat surface 4 when the cover is mounted on the fixture 8.

The light transparent prismatic plate 2 exhibits a phenomenon such that the fluorescent lamp light source 7 becomes invisible and is not distinguishable as to its configuration within the lamp cover when the lamp cover is observed from the exterior of the prismatic diffuser plate 2 and the entire surface of the prismatic diffuser plate appears as if it were a light emission surface. In order to obtain the phenomenal result the distance L from the inner surface of the transparent prismatic diffuser plate has to be selected with reference to the size of the prismatic projections, the refractive index thereof and the size of the diameter of the fluorescent light 7. This distance L is generally from about 16 to about 20 millimeters and can readily be determined and confirmed by easy experimentation. Since the fluorescent lamp cover is an integral molded unitary structure made of a light transparent material such as synthetic acrylic resin, the entire cover passes outwardly the light energy from the lamp. Light is reflected from a reflecting plate 8 of the illumination device or fixture which supports the light source 7 thus the efficiency of light transmission is maximized. Furthermore the appearance of the light source is greatly improved over known fluorescent lamp covers.

Figure 4:
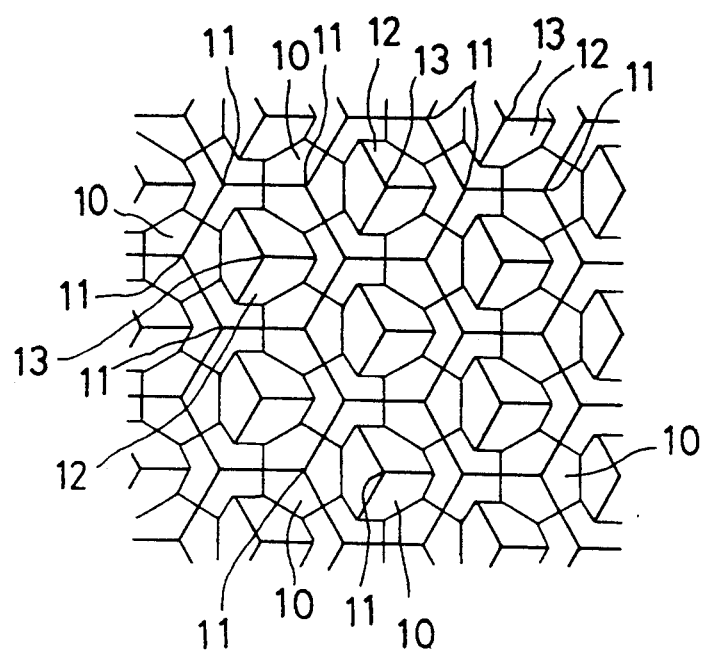
FIG. 4 is a fragmentary plan view of a prismatic diffuser of the fluorescent lamp cover illustrated in FIG. 2.
Figure 5:
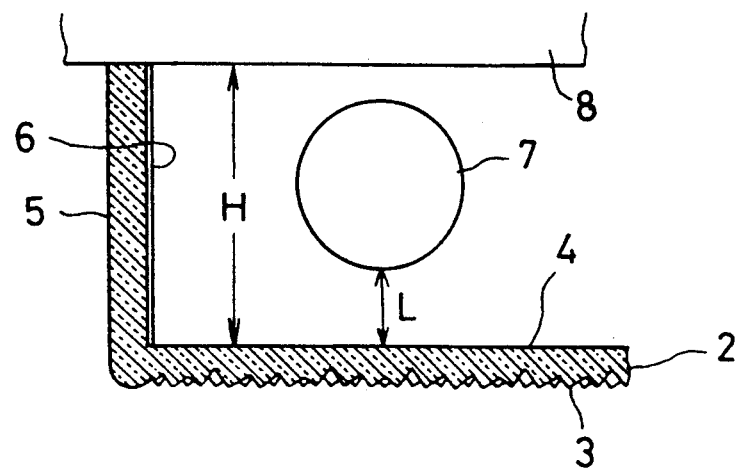
FIG. 5 is a fragmentary sectional view of a fluorescent lamp cover of the type illustrated in FIG. 2.

In order to obtain the phenomenal light dispersion and cause the light transparent prismatic diffuser plate to function as described above the prismatic diffuser surface 3 is constructed as illustrated in FIG. 4. This prismatic diffuser surface 3 is uneven but it does not gather dust and dirt as generally gathered by known molded covers having a coarse surface. The prismatic diffuser plate 2 is completely light transparent and makes it possible to obtain about 95% efficiency of the light power compared to an exposed light source.

The prismatic diffuser surface 3 utilized in the present invention has a large number of molded triangular pyramids 10 on the outer surface of the transparent diffuser plate 2 made of molded synthetic resin. These triangular pyramidal projections 10 are disposed relative to one another such that their pattern arrangement has the apexes 11 thereof positioned at the corners of equilateral hexagons as shown in FIG. 4. A second type of triangular pyramid or pyramidal projections 12 having apexes 13 are positioned at the center of recesses defined by the second type of triangular pyramids. The bases of the pyramids are contiguous and the sides are flat as shown in FIG. 4. This type of surface is itself known in the prior art (Japanese Utility Model Publication Nos. 42558/1979 and 29284/1984). This pattern of flat-sided pyramidal projections having the corresponding apex of each projection as the corresponding remote point, of the prismatic diffuser plate 2, from the fluorescent lamp light 7 exhibits the desired phenomenon of the prismatic diffuser surface to appear to be an independent illumination surface itself and through which the light outline source in the interior cannot be distinguished. The light configuration cannot be seen as is possible in the known fluorescent light covers when the cover is viewed.

The striations on the side plates are illustrated as formed in the interior surfaces of the side plates, however, they can be likewise formed on the outer surfaces of the side plates or on both the inner and outer surfaces when the unitary structure is molded of the cover.

Figure 6:
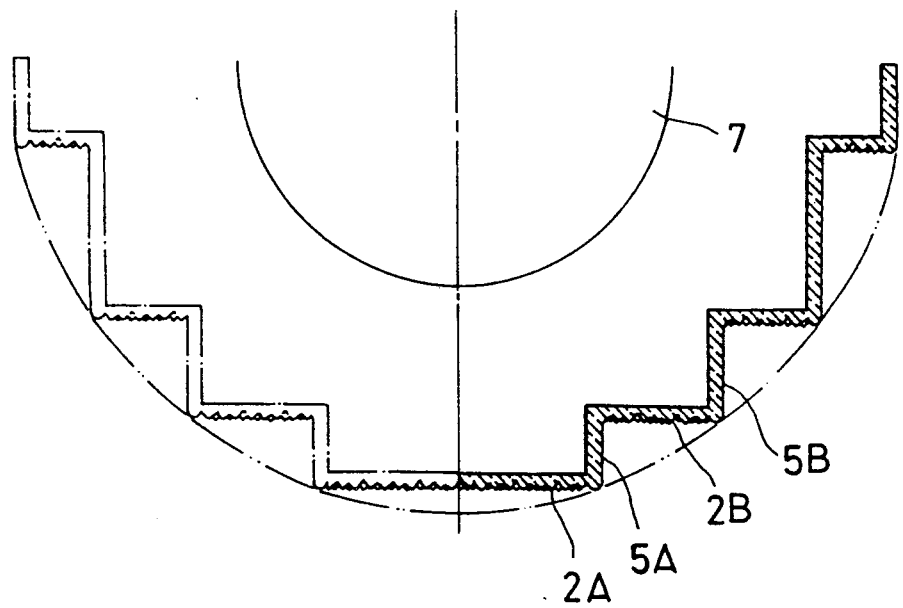
FIG. 6 is a fragmentary sectional view of another embodiment of a fluorescent lamp cover according to the invention.

The fluorescent light cover may be constructed as illustrated in FIG. 6 in which a plurality of transparent prismatic diffuser plates 2 are disposed in a stepped arrangement as shown. In this arrangement the prismatic diffuser plates 2A, 2B have related side plates 5A, 5B arranged integrally so that the prismatic diffuser plates are held arranged in stepped parallel planes as shown. This type of cover construction is effective when the fluorescent lamps being used have small diameters and can be juxtaposed relative one to the other or when the light source 7 has a large diameter as illustrated. In this embodiment the distance L of each of the prismatic diffuser plates, for example 2A, 2B, is maintained relative to the light source 7. Each prismatic diffuser plate appears to be an independent illumination source.

Those skilled in the art will understand that the illumination cover for fluorescent lamps according to the invention can be constructed in different configurations so long as the principles of the prismatic diffuser construction are followed using the pyramidal projections with flat sides arranged in accordance with the necessary structure to effect the desired light diffusion. They will understand the pyramidal projections are not geometric prisms but have an effect of light diffusion referred to herein as prismatic.

What I claim is:

1. A fluorescent lamp cover comprising a plurality of light-transparent plates integrally joined defining a fluorescent lamp cover having a length dimension for housing in an interior thereof a fluorescent lamp extending longitudinally therein, said fluorescent lamp cover having an opening for receiving the fluorescent lamp into the interior thereof extending in the length dimension, at least one of said light-transparent plates constituting a prismatic diffuser plate having an interior flat major side surface on which light energy from said fluorescent lamp is incident when the fluorescent lamp is on and said prismatic diffuser plate having an exterior major side surface opposite to said interior flat major side surface on which is disposed a pattern of adjacent pyramidal projections through which the light energy passes, each projection having an apex defining an outermost point of each corresponding projection, and said interior flat major side surface being disposed spaced from the fluorescent lamp a selected distance within the fluorescent lamp cover effective in conjunction with said pattern of pyramidal projections to render indistinguishable the configuration of a fluorescent lamp within the fluorescent lamp cover when the fluorescent lamp is on and the fluorescent lamp cover is viewed looking at the prismatic diffuser plate from externally thereof, said fluorescent lamp cover including a plurality of additional prismatic diffuser plates constructed similarly to a first-mentioned prismatic plate and facing exteriorly of said fluorescent lamp cover in a same direction, and each additional prismatic diffuser plate being spaced from said fluorescent lamp a corresponding selected distance to render indistinguishable the configuration of a fluorescent lamp within the fluorescent lamp cover when the fluorescent lamp is on and the fluorescent lamp cover is viewed externally thereof looking toward said prismatic diffuser plates.

2. A fluorescent lamp cover according to claim 1, in which all prismatic diffuser plates extend lengthwise in a same direction and are spaced in a circumferential direction in parallel planes about said fluorescent lamp in positions to render indistinguishable the configuration of the fluorescent lamp when the fluorescent lamp is on and the fluorescent lamp cover is viewed looking toward said prismatic diffuser plates from externally thereof and to render the prismatic diffuser plates to appear to be independent illumination source.

* * * * *